United States Patent
Tanabe et al.

(10) Patent No.: US 8,300,604 B2
(45) Date of Patent: Oct. 30, 2012

(54) RADIO COMMUNICATION SYSTEM AND RADIO COMMUNICATION METHOD

(75) Inventors: Akimichi Tanabe, Kawasaki (JP); Kazuyuki Kozu, Yokohama (JP); Masashi Kanauchi, Yokosuka (JP); Minami Ishii, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 203 days.

(21) Appl. No.: 12/680,490

(22) PCT Filed: Sep. 26, 2008

(86) PCT No.: PCT/JP2008/067545
§ 371 (c)(1),
(2), (4) Date: Jul. 1, 2010

(87) PCT Pub. No.: WO2009/041649
PCT Pub. Date: Apr. 2, 2009

(65) Prior Publication Data
US 2010/0260143 A1    Oct. 14, 2010

(30) Foreign Application Priority Data
Sep. 28, 2007   (JP) ................ 2007-255537

(51) Int. Cl.
*H04W 36/00* (2009.01)
(52) U.S. Cl. ................ 370/331; 455/436
(58) Field of Classification Search .......... 370/331; 455/436
See application file for complete search history.

(56) References Cited

U.S. PATENT DOCUMENTS

| | | | | |
|---|---|---|---|---|
| 2006/0239229 | A1* | 10/2006 | Marinescu et al. | 370/331 |
| 2008/0025263 | A1* | 1/2008 | Pelkonen | 370/332 |
| 2008/0318574 | A1* | 12/2008 | Bi | 455/436 |
| 2009/0029703 | A1* | 1/2009 | Turnbull et al. | 455/436 |

FOREIGN PATENT DOCUMENTS

| | | | |
|---|---|---|---|
| JP | 2001-309432 A | 11/2001 |
| JP | 2003-274437 A | 9/2003 |
| JP | 2004-363730 A | 12/2004 |
| WO | 2007007990 A1 | 1/2007 |

OTHER PUBLICATIONS

3GPP TR 23.882 V1.9.0, "3GPP System Architecture Evolution: Report on Technical Options and Conclusions," Mar. 2007, 183 pages.

(Continued)

*Primary Examiner* — Brian D Nguyen
(74) *Attorney, Agent, or Firm* — Osha Liang LLP (57) ABSTRACT

A radio communication system includes an EPC 100, a 3G network 200 and a mobile station 10 connectable to an external network 300 via any one of the EPC 100 and the 3G network 200. The communication system includes: a handover function unit configured to control a handover from the EPC 100 to the 3G network 200. The number of EPS bearers allowed to be set up with the mobile station 10 and the EPC 100 is larger than the number of PDP contexts allowed to be set up with the mobile station 10 and the 3G network 200. The handover function unit controls the handover in accordance with the number of the EPS beaters already set up with the mobile station 10 and the EPC 100 and the number of the PDP contexts to be newly set up with the mobile station 10 and the 3G network 200.

6 Claims, 9 Drawing Sheets

OTHER PUBLICATIONS

International Search Report issued in PCT/JP2008/067545, mailed on Oct. 28, 2008, with translation, 3 pages.
Written Opinion issued in PCT/JP2008/067545, mailed on Oct. 28, 2008, 3 pages.
Japanese Office Action for Application No. 2007-255537, mailed on Jan. 4, 2011 (5 pages).
Office Action issued Mar. 27, 2012 in corresponding Japanese application No. 2011-095289, with translation (4 pages).

* cited by examiner

| BEARER ID | BEARER CLASS | BIT RATE |
|---|---|---|
| BEARER a | CLASS 1 | xxxMbps |
| BEARER b | CLASS 2 | yyyMpbs |
| BEARER c | CLASS 3 | zzzMpbs |
| ... | ... | ... |

NOTE:: zzz<xxx<yyy

| BEARER ID | EXTERNAL NW ID | EXTERNAL NW PRIORITY |
|---|---|---|
| BEARER a | EXTERNAL NW#1 | HIGH |
| BEARER b | EXTERNAL NW#2 | MIDDLE |
| BEARER c | EXTERNAL NW#3 | LOW |
| ... | ... | ... |

FIG. 11

RADIO COMMUNICATION SYSTEM AND RADIO COMMUNICATION METHOD

TECHNICAL FIELD

The present invention relates to a radio communication system including multiple networks each capable of setting up a different number of bearers with a mobile station, and to a radio communication method.

BACKGROUND ART

In recent years, the types of networks to which a mobile station can connect have been diversified along with the advancement of radio communication technologies. Examples of the networks to which a mobile station can connect include: (1) the third generation radio communication network; (2) the next generation radio communication network; (3) WLAN specified in IEEE802.11, (4) WiMAX specified in IEEE802.16 and the like; and so forth.

In addition, on the assumption that a mobile station is connectable to multiple networks, a technique to switch a network to which the mobile station connects from one to another (handover technique) has been also proposed (3GPP TR23.882 V1.9.0 (Section 7.8.2), for example).

The aforementioned switching (handover) of the network is performed in a case where a communication quality is deteriorated in the network to which the mobile station connects, or the like, for example.

Here, a bearer that can be set up with the mobile station and each type of network is dependent on the capabilities of the type of network and the mobile station. For this reason, the number of bearers that can be set up with the mobile station and each type of network differs from one network to another.

Accordingly, in the aforementioned handover, there may be a case where the number of bearers that can be set up with the mobile station and a handover source network is larger than the number of bearers that can be set up with the mobile station and a handover destination network.

In the aforementioned case, the handover destination network cannot take over the service provided in the handover source network. In sum, along with the diversification of the types of networks to which the mobile station can connect, it is expected that a handover cannot be appropriately performed.

DISCLOSURE OF THE INVENTION

In an aspect, a radio communication system includes a first communication network, a second communication network and a mobile station connectable to an external network via any one of the first communication network and the second communication network. The communication system includes: a handover function unit configured to control a handover from the first communication network to the second communication network. The number of first bearers allowed to be set up with the mobile station and the first communication network is larger than the number of second bearers allowed to be set up with the mobile station and the second communication network. The handover function unit controls the handover in accordance with the number of the first bearers already set up with the mobile station and the first communication network and the number of the second bearers to be newly set up with the mobile station and the second communication network.

According to the aspect, the handover function unit controls the handover in accordance with the number of EPS bearers already set up with the mobile station and the first communication network and the number of the second radio bearers to be set up with the mobile station and the second communication network. Accordingly, the handover can be appropriately performed under the assumption of diversification of the types of networks to which the mobile station can connect.

In the aspect, the radio communication system further includes: a gateway device provided between the first communication network and the external network and also between the second communication network and the external network. The handover function unit has a management function to manage a table for associating the first bearers already set up with the mobile station and the first communication network, with the second bearers to be newly set up with the mobile station and the second communication network. The handover function unit is provided in the gateway device.

In the aspect, the handover function unit has a disconnection function to disconnect at least one of the first bearers already set up with the mobile station and the first communication network in accordance with priorities of the first bearers, when the number of the first bearers already set up with the mobile station and the first communication network is larger than the number of the second bearers to be newly set up with the mobile station and the second communication network.

In the aspect, the external network includes a first external network and a second external network. The mobile station is connected to the first external network via a first bearer A that is any one of the first bearers already set up with the mobile station and the first communication network, and is connected to the second external network via a first bearer B that is any one of the first bearers already set up with the mobile station and the first communication network. The handover function unit has a disconnection function to disconnect any one of the first bearer A and the first bearer B in accordance with priorities of the external networks, when the number of the first bearers already set up with the mobile station and the first communication network is larger than the number of the second bearers to be newly set up with the mobile station and the second communication network.

In an aspect, a radio communication method for controlling a handover from a first communication network to a second communication network in a radio communication system. The radio communication system includes the first communication network, the second communication network and a mobile station connectable to an external network via any one of the first communication network and the second communication network. The number of first bearers allowed to be set up with the mobile station and the first communication network is larger than the number of second bearers allowed to be set up with the mobile station and the second communication network. The radio communication method includes: controlling the handover in accordance with the number of the first bearers already set up with the mobile station and the first communication network and the number of the second bearers to be newly set up with the mobile station and the second communication network.

BEST MODES FOR CARRYING OUT THE INVENTION

Hereinafter, a description will be given of radio communication systems according to embodiments of the present invention with reference to the drawings. Note that, the same or similar reference numerals are given to denote the same or similar portions in the description of the drawings below.

It should be noted however that the drawings are schematic, so that dimensional proportions and the like are different from actual ones. Accordingly, the specific dimensions and the like are to be judged by referring to the description below. In addition, it goes without saying that there are portions having dimensional relationships and dimensional proportions different from one drawing to another.

First Embodiment (Overview of Radio Communication System)

Figure 1:
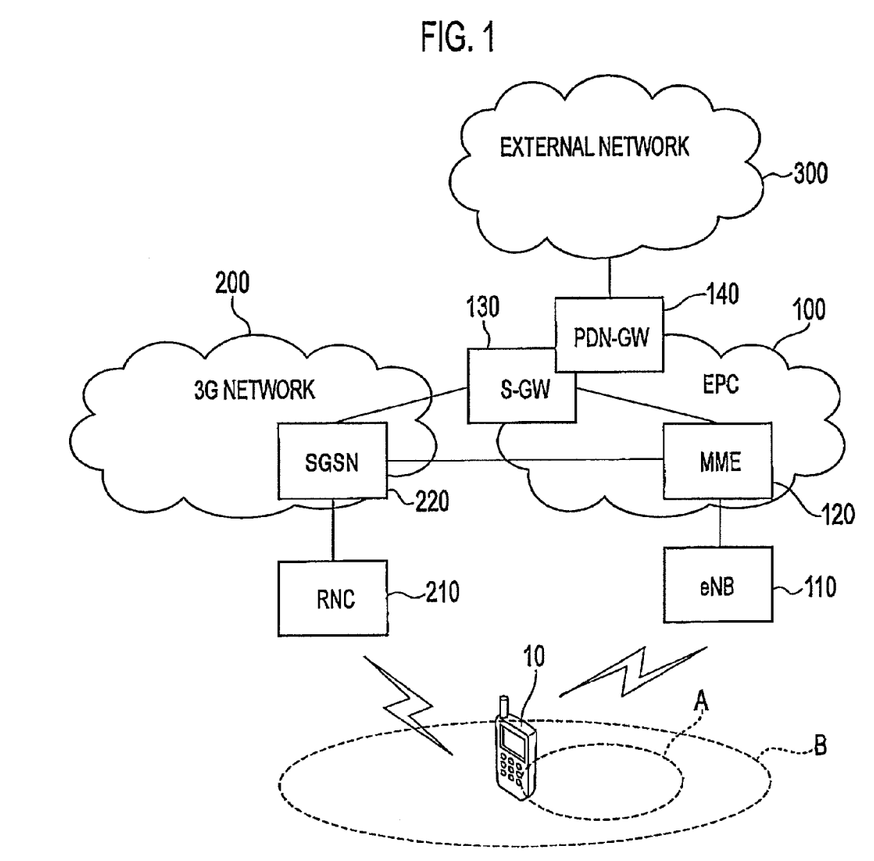
FIG. 1 is a schematic diagram showing a radio communication system according to a first embodiment.

Hereinafter, an overview of a radio communication system according to a first embodiment will be described with reference to the drawings. FIG. 1 is a schematic diagram showing the radio communication system according to the first embodiment.

It should be noted that FIG. 1 shows only constituents necessary to describe the first embodiment. It should be thus noted that a constituent such as an HLR (Home Location Register) other than the constituent shown in FIG. 1 is actually provided in the radio communication system.

The radio communication system includes a mobile station 10, an eNB 110, an MME 120, an S-GW 130, a PDN-GW 140, an RNC 210 and an SGSN 220 as shown in FIG. 1.

Here, it should be noted that the eNB 110, MME 120, S-GW 130 and PDN-GW 140 form the next generation radio communication network. The MME 120, S-GW 130 and PDN-GW 140 are provided on an EPC 100 (Evolved Packet Core). Note that, the EPC 100 is a core network of the next generation radio communication network.

LTE (Long Term Evolution), SAE (System Architecture Evolution) or the like is used in the next generation radio communication network. The next generation radio communication network is sometimes termed as "Super 3G," "3.9 Generation" or the like.

Meanwhile, it should be noted that the RNC 210 and SGSN 220 form the third generation radio communication network. The SGSN 220 is provided on a 3G network 200. Note that, the 3G network 200 is a core network of the third generation radio communication network. Although the third generation radio communication network has a circuit switched domain and a packet switched domain, a description will be mainly given of the packet switched domain in the first embodiment.

The mobile station 10 is configured to be connectable to the EPC 100 via the eNB 110. A bearer (hereinafter, referred to as an EPS bearer) is set up between the mobile station 10 and the PDN-GW 140 via the EPC 100. The mobile station 10 is configured to be connectable to an external network 300 via the EPC 100. In other words, the mobile station 10 connects to the external network 300 via the EPS bearer.

The mobile station 10 is configured to be connectable to the 3G network 200 via a base station (not shown) or the RNC 210. A bearer (hereinafter, referred to as a PDP context) is set up between the mobile station 10 and the PDN-GW 140 via the 3G network 200. The mobile station 10 is configured to be connectable to the external network 300 via the 3G network 200. In other words, the mobile station 10 connects to the external network 300 via the PDP context.

Here, it should be noted that the mobile station 10 is capable of connecting to only one of the EPC 100 and the 3G network 200. Specifically, the mobile station 10 is configured to be connectable individually to the next generation radio communication network or the third generation radio communication network.

The mobile station 10 is capable of performing a handover from the next generation radio communication network to the third generation radio communication network when moving from an area A to an area B. Likewise, the mobile station 10 is capable of performing a handover from the third generation radio communication network to the next generation radio communication network when moving from the area B to the area A.

In the first embodiment, a case where a handover is performed from the next generation radio communication network to the third generation radio communication network (packet switched domain) is mainly considered.

The eNB 110 is a radio station (evolved NODE B) which manages the area A and sets up a radio connection with the mobile station 10 located within the service area of the area A.

The MME 120 is a device (Mobility Management Entity) which is connected to the eNB 110 and manages the mobility of the mobile station 10 with which the eNB 110 sets up the radio connection.

The MME 120 is connected to the SGSN 220 and the S-GW 130 and is capable of transmitting and receiving various pieces of information to and from the SGSN 220 and the S-GW 130.

The S-GW 130 is a gateway (Serving Gateway) which terminates a signal from the mobile station 10 in the EPC 100. The S-GW 130 is connected to the MME 120 and the SGSN 220, and is capable of transmitting and receiving various pieces of information to and from the MME 120 and the SGSN 220.

The PDN-GW 140 is a gateway (Packet Data Network Gateway) which is connected to the S-GW 130 and provided at the interface between the EPC 100 and the external network 300. The PDN-GW 140 performs processing such as assigning an IP address to the mobile station 10.

The RNC 210 is a radio station (Radio Network Controller) which manages the area B and sets up a radio connection with the mobile station 10 located within the service area of the area B.

The SGSN 220 is a device (Serving GPRS Support Node) which performs packet switching in the 3G network 200. The SGSN 220 is connected to the MME 120 and the S-GW 130 and is capable of transmitting and receiving various pieces of information to and from the MME 120 and the S-GW 130.

(Number of Bearers that can be Set Up)

Hereinafter, a description will be given of the number of bearers that can be set up according to the first embodiment. The number of bearers that can be set up with the mobile station 10 and each type of network is determined depending on the capability of the type of network and the capability of the mobile station 10. The capability of the mobile station 10 differs from one network to another.

For example, consider a case where the capability of each type of network and the capability of the mobile station 10 are as follows.

(1) Capability of EPC 100

The number of EPS bearers that the EPC 100 is capable of setting up with the mobile station 10=3

(2) Capability of 3G Network 200

The number of PDP contexts that the 3G network 200 is capable of setting up with the mobile station 10=1

(3) Capability of Mobile Station 10

The number of EPS bearers that the mobile station 10 is capable of setting up with the EPC 100=4

The number of PDP contexts that the mobile station 10 is capable of setting up with the 3G network 200=1

In the aforementioned case, the number of EPS bearers that can be set up with the mobile station 10 and the EPC 100 is determined within a range not exceeding the capability of the EPC 100 and the capability of the mobile station 10. Accordingly, the maximum number of EPS bearers that can be set up with the mobile station 10 and the EPC 100 is "3."

Meanwhile, the number of PDP contexts that can be set up with the mobile station 10 and the 3G network 200 is determined within a range not exceeding the capability of the 3G network 200 and the capability of the mobile station 10. Accordingly, the number of PDP contexts that can be set up with the mobile station 10 and the 3G network 200 is "1."

What is mainly considered in the first embodiment is a case where the number of EPS bearers that can be set up with the mobile station 10 and the EPC 100 is greater than the number of PDP contexts that can be set up with the mobile station 10 and the 3G network 200.

(Details of PDN-GW)

Hereinafter, a description will be given of details of the PDN-GW (Packet Data Network Gateway) according to the first embodiment.

The PDN-GW 140 is connected to the S-GW 130 as described above. Moreover, the S-GW 130 is connected to the MME 120 and the SGSN 220.

In other words, the PDN-GW 140 is a gateway device provided between the EPC 100 and the external network 300, and provided between the 3G network 200 and the external network 300.

Here, the PDN-GW 140 has a table (hereinafter, referred to as a packet filter) for associating bearers such as the EPS bearer and the PDP context with various protocols. The various protocols associated with the bearers are protocols that operate on UDP (User Datagram Protocol) or TCP (Transmission Control Protocol). Examples of the various protocols associated with the bearers include SIP (Session Initiation Protocol), RTP (Real-time Transport Protocol), FTP (File Transfer Protocol) and the like.

Note that, the bearers such as the EPS bearer and the PDP context are identifiable by bearer IDs. The various protocols associated with the bearers are identifiable by port numbers for identifying applications operating on the mobile station 10.

Figure 2A:
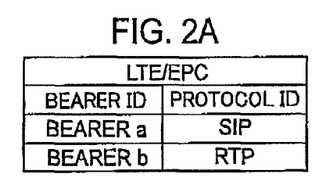
FIG. 2 is a view showing packet filters according to the first embodiment.

For example, when the EPS bearers are set up between the mobile station 10 and the EPC 100, the PDN-GW 140 has a packet filter shown in FIG. 2(a). As shown in FIG. 2(a), a "bearer ID" column and a "protocol ID" column are provided under a "LTE/EPC" column. Bearer IDs ("bearer a" and "bearer b," for example) for identifying the respective EPS bearers are stored in the "bearer ID" column. IDs of the various protocols ("SIP" and "RTP," for example) which are each associated with the corresponding bearers, are stored in the "protocol ID" column. Note that, in addition to the "protocol ID," an outgoing and incoming IP address, a port number and the like may be used as constituent elements of the packet filter.

As described above, when the EPS bearers are set up between the mobile station 10 and the EPC 100, the PDN-GW 140 has the packet filter that associates the EPS bearers with the various protocols.

The PDN-GW 140 selects one of the EPS bearers, which corresponds to a packet received from the external network 300, by use of the packet filter, and then transmits the packet to the mobile station 10 via the selected EPS bearer.

Figure 2B:
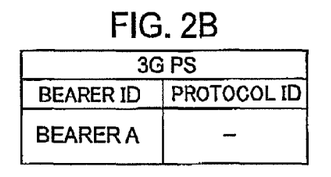

Meanwhile, when the PDP context is set up between the mobile station 10 and the 3G network 200, the PDN-GW 140 has a packet filter shown in FIG. 2(b). As shown in FIG. 2(b), a "bearer ID" column and a "protocol ID" column are provided under a "3G PS" column. Bearer IDs ("bearer A," for example) for identifying the respective PDP contexts are stored in the "bearer ID" column. Names of the various protocols, which are each associated with the corresponding bearers, are stored in the "protocol ID" column (here, no protocol name is stored).

It should be noted that the PDP context and the protocol do not have to be associated with each other in a case where the PDP context between the mobile station 10 and the 3G network 200 is "1." Accordingly, the PDN-GW 140 does not have to have the table shown in FIG. 2(b) in this case.

Next, a case where a handover from the EPC 100 to the 3G network 200 is performed is considered. Here, the EPC 100 is capable of setting up a large number of bearers with the mobile station 10, and the 3G network 200 is capable of setting up a small number of bearers with the mobile station 10.

Note that, an assumption is made that the two bearers shown in FIG. 2(a) are already set up via the EPC 100. In addition, an assumption is made that the PDP context shown in FIG. 2(b) is to be newly set up via the 3G network 200.

Figure 2C:
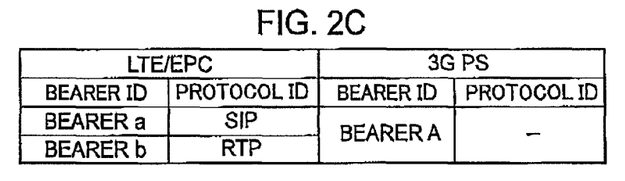

In this case, the PDN-GW 140 has a packet filter shown in FIG. 2(c). As shown in FIG. 2(c), the packet filter associates the packet filter shown in FIG. 2(a) with the packet filter shown in FIG. 2(b).

In other words, the PDN-GW 140 manages the table (packet filter) for associating the bearer IDs of the EPS bearers already set up with the mobile station 10 and the EPC 100 and the bearer ID of the PDP context set up with the mobile station 10 and the 3G network 200.

As described above, in the handover from the EPC 100 to the 3G network 200, the PDN-GW 140 maps the EPS bearers to the PDP context and thus manages the packet filter associating the EPS bearers with the PDP context.

(Operation of Radio Communication System)

Hereinafter, a description will be given of an operation of the radio communication system according to the first embodiment with reference to the drawings.

(Determination of Number of Bearers that can be Set Up)

Firstly, with reference to FIGS. 3 to 5, a description will be given of an operation of determining the number of bearers that can be set up. The operation of determining the number of bearers that can be set up is performed in, for example, (1) setting up or updating of an RRC connection, (2) network attach processing and (3) activation of a bearer. Note that, in FIGS. 3 to 5, an operation of determining the number of bearers that can be set up with the mobile station 10 and the EPC 100 is cited as an example.

Figure 3:
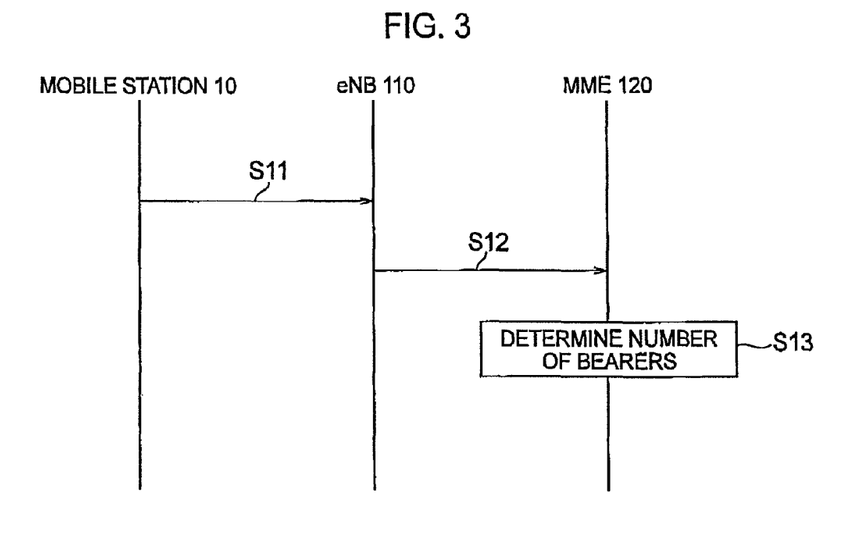
FIG. 3 is a sequence diagram showing an operation of the radio communication system according to the first embodiment.

FIG. 3 is a diagram showing the operation of determining the number of bearers that can be set up with the mobile station 10 and the EPC 100 when an RRC connection is set up or updated.

As shown in FIG. 3, in step 11, the mobile station 10 transmits completion report information ("RRC connection modification complete," for example), indicating that setting up or updating of an RRC connection is completed, to the eNB 110. Here, the completion report information includes the capability of the mobile station 10, i.e., the number of EPS bearers that the mobile station 10 is capable of setting up with the eNB 110.

In step 12, the eNB 110 includes the capability of the mobile station 10, i.e., the number of EPS bearers that the mobile station 10 is capable of setting up with the eNB 110 in information as a response to an EPS bearer setup request ("Initial Context Setup Response," for example), and then transmits the response information including the capability of the mobile station 10 to the MME 120.

In step 13, the MME 120 determines the number of EPS bearers that can be set up with the mobile station 10 and the EPC 100 within a range not exceeding the capability of the EPC 100 and the capability of the mobile station 10.

Figure 4:
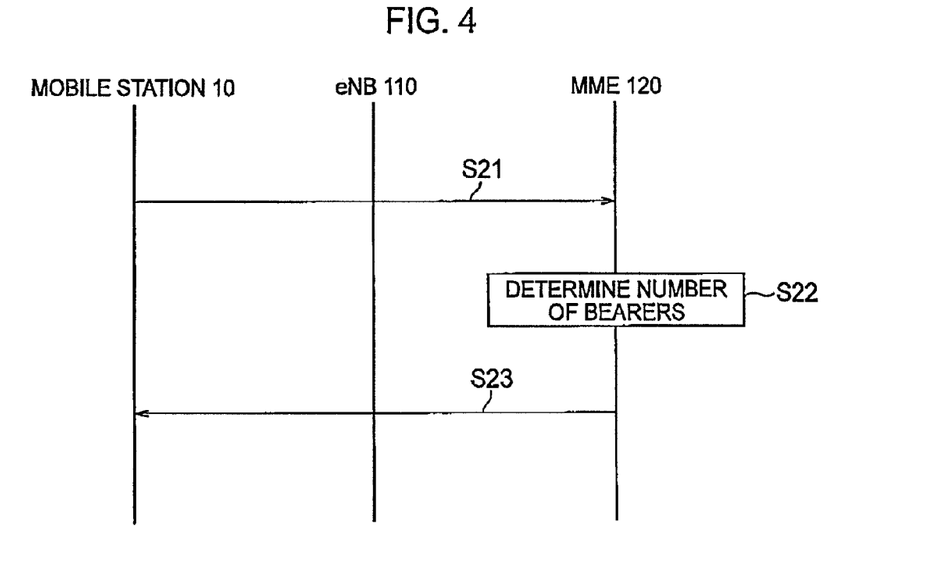
FIG. 4 is a sequence diagram showing the operation of the radio communication system according to the first embodiment.

FIG. 4 is a diagram showing the operation of determining the number of bearers that can be set up with the mobile station 10 and the EPC 100 when processing for attachment to the EPC 100 is performed.

As shown in FIG. 4, in step 21, the mobile station 10 transmits information for requesting for attachment to the EPC 100 ("Attach Request," for example) to the MME 120. Here, the attach request information includes the capability of the mobile station 10, i.e., the number of EPS bearers that the mobile station 10 is capable of setting up with the eNB 110.

In step 22, the MME 120 determines the number of EPS bearers that can be set up with the mobile station 10 and the EPC 100 within a range not exceeding the capability of the EPC 100 and the capability of the mobile station 10.

In step 23, the MME 120 transmits attach acceptance information ("Attach Accept," for example), indicating that the attach processing is accepted, to the mobile station 10. Here, the attach acceptance information includes the number of EPS bearers which is determined in step 22.

Figure 5:
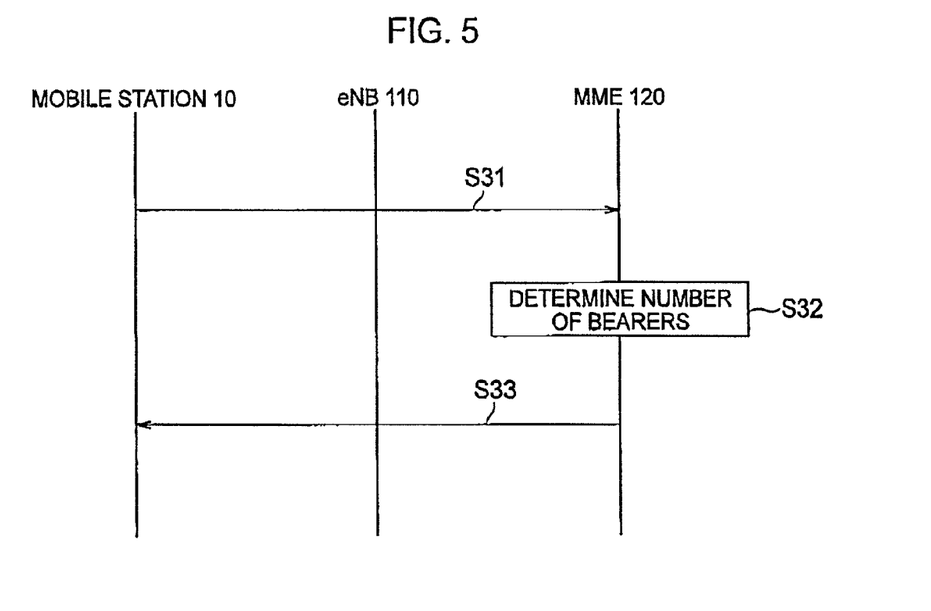
FIG. 5 is a sequence diagram showing the operation of the radio communication system according to the first embodiment.

FIG. 5 is a diagram showing the operation of determining the number of bearers that can be set up with the mobile station 10 and the EPC 100 when the EPS bearer is activated.

As shown in FIG. 5, in step 31, the mobile station 10 transmits an EPS bearer activation request ("EPS Bearer Activation," for example) to the MME 120. Here, the EPS bearer activation request includes the capability of the mobile station 10, i.e., the number of EPS bearers that the mobile station 10 is capable of setting up with the eNB 110.

In step 32, the MME 120 determines the number of EPS bearers that can be set up with the mobile station 10 and the EPC 100 within a range not exceeding the capability of the EPC 100 and the capability of the mobile station 10.

In step 33, the MME 120 transmits activation acceptance information ("EPS Bearer Activation Accept," for example), indicating that the EPS bearer activation request is accepted, to the mobile station 10. Here, the activation acceptance information includes the number of EPS bearers which is determined in step 32.

(Handover)

Hereinafter, with reference to FIG. 6, a description will be given of a handover from a network capable of setting up a large number of bearers with the mobile station 10 (EPC 100) to a network capable of setting up a small number of bearers with the mobile station 10 (3G network 200). Note that, an assumption is made that the EPS bearers (the EPS bearer a and EPS bearer b) are already set up with the mobile station 10 and the EPC 100 in FIG. 6. Moreover, an assumption is made that a PDP context A is to be newly set up between the mobile station 10 and the PDN-GW 140 via the 3G network 200 during the handover process.

Here, the function to control a handover between networks is termed as a handover function. Since a handover is achieved by cooperation of multiple devices, the handover function is considered to be dispersed in the multiple devices (the mobile station 10, MME 120, PDN-GW 140, S-GW 130, SGSN 220 and the like, for example).

Figure 6:
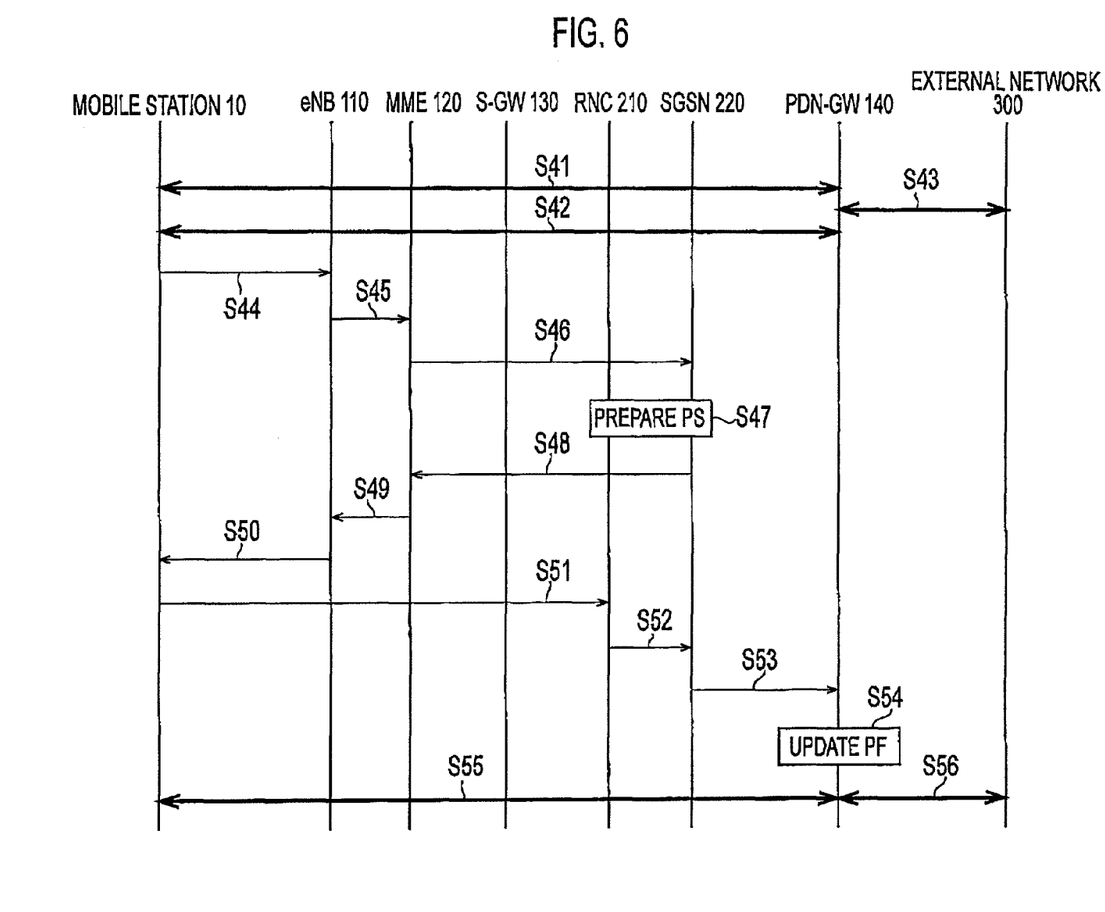
FIG. 6 is a sequence diagram showing the operation of the radio communication system according to the first embodiment.

As shown in FIG. 6, in steps 41 and 42, the EPS bearer a and the EPS bearer b are already set up between the mobile station 10 and the PDN-GW 140 via the EPC 100. Moreover, packets are transmitted and received between the mobile station 10 and the PDN-GW 140 via the EPS bearer a and the EPS bearer b.

In step 43, the PDN-GW 140 transmits a packet received from the external network 300 to the mobile station 10, and transmits a packet received from the mobile station 10 to the external network 300. Here, the PDN-GW 140 has the aforementioned packet filter shown in FIG. 2(*b*), and transmits a packet to the mobile station 10 by using the packet filter.

In step 44, the mobile station 10 first measures a radio quality in the area A managed by the eNB 110, and then transmits a measurement result of the radio quality in the area A ("Measurement Report," for example) to the eNB 110.

In step 45, the eNB 110 transmits information ("Relocation Required," for example) to the MME 120, the information indicating that change of the network to which the mobile station 10 connects (specifically, change from the EPC 100 to the 3G network 200) is requested.

In step 46, the MME 120 transmits a change request of the network to which the mobile station 10 connects ("Relocation Request," for example), to the SGSN 220.

In step 47, the RNC 210 and the SGSN 220 prepare to connect the mobile station 10 and the 3G network 200. Specifically, processing operations such as the following are performed: (1) processing to set up an RRC connection between the mobile station 10 and the RNC 210; (2) processing to set up a radio access bearer (RAB) between the mobile station 10 and the SGSN 220; and (3) processing to set up the PDP context A between the mobile station 10 and the PDN-GW 140 via the 3G network 200.

In step 48, the SGSN 220 transmits acknowledge response information ("Relocation Request Ack," for example), indicating that the change of the network is acknowledged, to the MME 120. Here, the acknowledge response information includes the number of PDP contexts that can be set up with the mobile station 10 and the 3G network 200. The acknowledge response information includes a bearer ID for identifying the PDP context A set up in step 47.

In step 49, the MME 120 transmits preparation completion information, indicating that the preparation to connect the mobile station 10 and the 3G network 200 is completed, to the eNB 110. Here, the preparation completion information includes the bearer ID for identifying the PDP context A set up in step 47.

In step 50, the eNB 110 transmits handover instruction information ("HO Command," for example), indicating an instruction to perform a handover from the EPC 100 to the 3G network 200, to the mobile station 10. Here, the handover instruction information includes the bearer ID for identifying the PDP context A set up in step 47.

In step 51, the mobile station 10 transmits information indicating that the handover from the EPC 100 to the 3G network 200 is completed ("HO Complete," for example), to the RNC 210.

In step 52, the RNC 210 transmits information indicating that the change of the network to which the mobile station 10 connects (specifically, the change from the EPC 100 to the 3G network 200) is completed ("Relocation Complete," for example), to the SGSN 220.

In step 53, the SGSN 220 transmits update request information indicating a request to update the bearer ("Update PDP Context Request," for example), to the PDN-GW 140.

In step 54, the PDN-GW 140 updates the table (packet filter) for associating the bearers and the protocols. Specifically, the PDN-GW 140 maps the EPS bearer a and the EPS bearer b to the PDP context, and then updates the packet filter shown in FIG. 2(*a*) with the packet filter shown in FIG. 2(*c*).

In step 55, the PDP context A is set up between the mobile station 10 and the PDN-GW 140 via the 3G network 200. Moreover, packets are transmitted and received between the mobile station 10 and the PDN-GW 140 via the PDP context A.

In step 56, the PDN-GW 140 transmits a packet received from the external network 300 to the mobile station 10, and transmits a packet received from the mobile station 10 to the external network 300. Here, the PDN-GW 140 has the aforementioned packet filter shown in FIG. 2(*c*), and transmits a packet to the mobile station 10 by using the packet filter.

(Effects and Advantages)

In the first embodiment, the PDN-GW 140 controls a handover in accordance with the number of EPS bearers already set up with the mobile station 10 and the EPC 100 and the number of PDP contexts to be set up with the mobile station 10 and the 3G network 200. Accordingly, the handover can be appropriately performed under the assumption of diversification of the types of networks to which the mobile station 10 can connect.

Specifically, the PDN-GW 140 maps multiple EPS bearers already set up to a PDP context to be newly set up during the process of the handover from the EPC 100 to the 3G network 200. In other words, the PDN-GW 140 manages the table (packet filter) for associating the multiple EPS bearers with the PDP context.

Accordingly, even when the number of EPS bearers that can be set up via the EPC 100 is larger than the number of PDP contexts that can be set up via the 3G network 200, the handover can be appropriately performed.

Second Embodiment

Hereinafter, a description will be given of a second embodiment with reference to the drawings. In the description below, differences between the aforementioned first embodiment and the second embodiment will be mainly described.

Specifically, in the aforementioned first embodiment, the PDN-GW 140 maps the EPS bearers already set up with the mobile station 10 and the EPC 100 to the PDP context to be newly set up with the mobile station 10 and the 3G network 200 in the handover from the EPC 100 to the 3G network 200.

Meanwhile, in the second embodiment, the MME 120 provided to the EPC 100 disconnects part of the EPS bearers already set up with the mobile station 10 and the EPC 100 in the handover from the EPC 100 to the 3G network 200.

(Details of MME)

Hereinafter, a description will be given in detail of an MME (Mobility Management Entity) according to the second embodiment.

Figure 7:
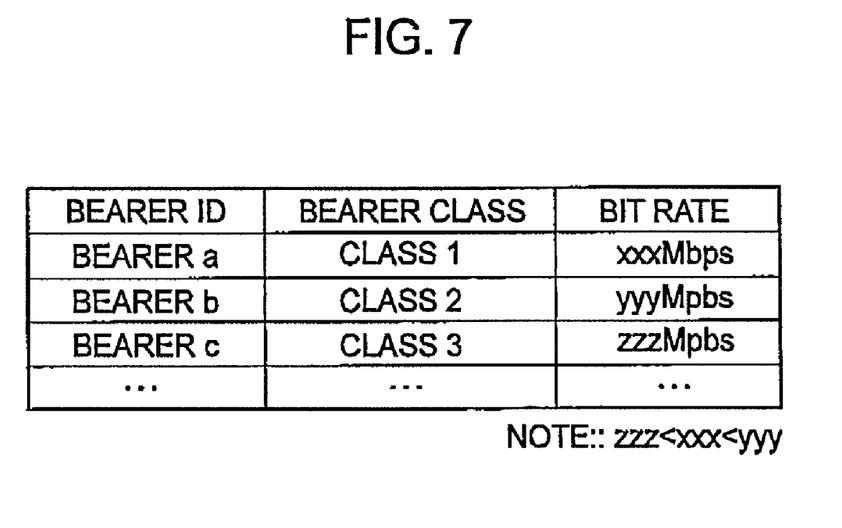
FIG. 7 is a diagram showing a bearer priority table according to a second embodiment.

As shown in FIG. 7, the MME 120 has a bearer priority table for managing the priorities of the EPS bearers already set up with the mobile station 10 and the EPC 100.

Specifically, as shown in FIG. 7, a "bearer ID" column, a "bearer class" column and a "bit rate" column are provided in the bearer priority table. IDs ("bearer a" to "bearer c," for example) for identifying the respective EPS bearers already set up with the mobile station 10 and the EPC 100 are stored in the "bearer ID" column. Bearer classes ("class 1" to "class 3," for example) determined in accordance with QoS qualities respectively requested by services provided via the respective EPS bearers are stored in the "bearer class" column. Here, the priority of the class 1 is the highest, and the priority of the class 3 is the lowest. Bit rates at which data is transmitted and received via the respective EPS bearers are stored in the "bit rate" column.

When the number of EPS bearers already set up with the mobile station 10 and the EPC 100 is larger than the number of PDP contexts to be set up with the mobile station 10 and the 3G network 200, the MME 120 disconnects part of the EPS bearers already set up with the mobile station 10 and the EPC 100. Specifically, the MME 120 disconnects part of the EPS bearers so that the number of EPS bearers can be the same as the number of PDP contexts. The MME 120 may disconnect the EPS bearers in the order from the EPS bearer having a low priority, for example. The MME 120 may disconnect the EPS bearers in the order from the EPS bearer having a low bit rate. The MME 120 may determine the priorities of the EPS bearers in consideration of both of the bearer classes and the bit rates and then disconnect the EPS bearers in the order from the EPS bearer having a low priority.

(Operation of Radio Communication System)

Figure 8:
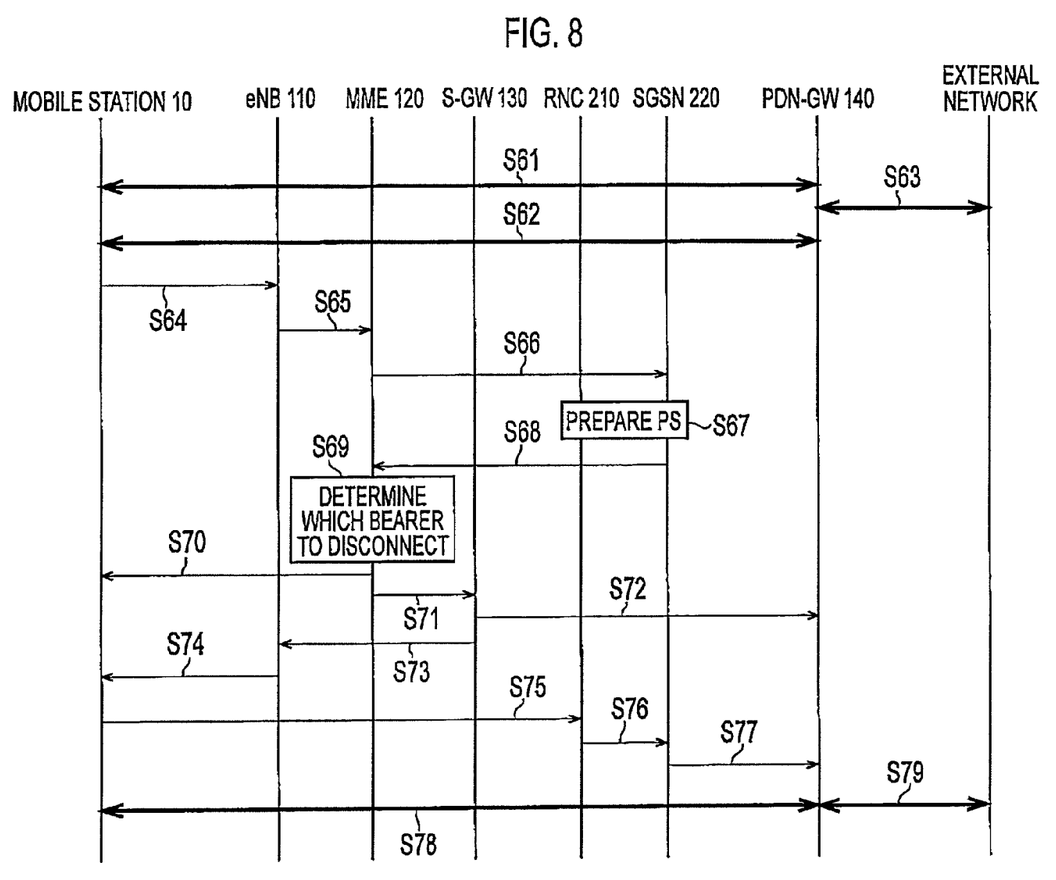
FIG. 8 is a sequence diagram showing an operation of a radio communication system according to the second embodiment.

Hereinafter, a description will be given of an operation of a radio communication system according to the second embodiment with reference to the drawings. FIG. 8 is a sequence diagram showing the operation of the radio communication system according to the second embodiment.

In FIG. 8, a handover from a network capable of setting up a large number of bearers with the mobile station 10 (EPC 100) to a network capable of setting up a small number of bearers with the mobile station 10 (3G network 200) is considered as in the case of the first embodiment. In addition, an assumption is made in FIG. 8 that the EPS bearers (the EPS bearer a and the EPS bearer b) are already set up with the mobile station 10 and the EPS 100. Moreover, an assumption is made that the PDP context A is to be newly set up between the mobile station 10 and the PDN-GW 140 via the 3G network 200 during the handover process.

As shown in FIG. 8, in steps 61 and 62, the EPS bearer a and the EPS bearer b are already set up between the mobile station 10 and the PDN-GW 140 via the EPC 100. In addition, packets are transmitted and received between the mobile station 10 and the PDN-GW 140 via the EPS bearer a and the EPS bearer b.

In step 63, the PDN-GW 140 transmits a packet received from the external network 300 to the mobile station 10 and transmits a packet received from the mobile station 10 to the external network 300. Here, the PDN-GW 140 has the aforementioned packet filter shown in FIG. 2(a) and transmits a packet to the mobile station 10 by using the packet filter.

In step 64, the mobile station 10 first measures a radio quality in the area A managed by the eNB 110, and then transmits a measurement result of the radio quality in the area A ("Measurement Report," for example), to the eNB 110.

In step 65, the eNB 110 transmits information ("Relocation Required," for example) to the MME 120, the information indicating that change of the network to which the mobile station 10 connects (specifically, change from the EPC 100 to the 3G network 200) is requested.

In step 66, the MME 120 transmits, to the SGSN 220, a request for changing the network to which the mobile station 10 connects ("Relocation Request," for example).

In step 67, the RNC 210 and the SGSN 220 prepare to connect the mobile station 10 and the 3G network 200. Specifically, processing operations such as the following are performed: (1) processing to set up an RRC connection between the mobile station 10 and the RNC 210; (2) processing to set up a radio access bearer (RAB) between the mobile station 10 and the SGSN 220; and (3) processing to set up the PDP context A between the mobile station 10 and the PDN-GW 140 via the 3G network 200.

In step 68, the SGSN 220 transmits acknowledge response information indicating that the change of the network is acknowledged ("Relocation Request Ack," for example), to the MME 120. Here, the acknowledge response information includes the number of PDP contexts that can be set up with the mobile station 10 and the 3G network 200. The acknowledge response information includes a bearer ID for identifying the PDP context A set up in step 67.

In step 69, the MME 120 compares the number of EPS bearers already set up with the mobile station 10 and the EPC 100 and the number of PDP contexts set up in step 67. Here, the number of EPS bearers (=2) is larger than the number of PDP contexts (=1).

Accordingly, the MME 120 refers to the aforementioned bearer priority table shown in FIG. 7 and thus determines which EPS bearer to disconnect. The MME 120 determines to disconnect the EPS bearer b, for example.

In step 70, the MME 120 transmits information indicating an instruction to disconnect the EPS bearer determined in step 69 to be disconnected ("Deactivate EPS Bearer," for example), to the mobile station 10.

In step 71, the MME 120 transmits information indicating an instruction to disconnect the EPS bearer determined in step 69 to be disconnected ("Deactivate EPS Bearer," for example), to the S-GW 130.

In step 72, the S-GW 130 transmits the information ("Deactivate EPS Bearer," for example) received in step 71 to the PDN-GW 140. Note that, the PDN-GW 140 deletes the EPS bearer b from the aforementioned packet filter shown in FIG. 2(a), the EPS bearer b determined in step 69 to be disconnected.

In step 73, the MME 120 transmits preparation completion information, indicating that the preparation to connect the mobile station 10 and the 3G network 200 is completed, to the eNB 110. Here, the preparation completion information includes the bearer ID for identifying the PDP context A set up in step 67.

In step 74, the eNB 110 transmits handover instruction information indicating an instruction to perform a handover from the EPC 100 to the 3G network 200 ("HO Command," for example), to the mobile station 10. Here, the handover instruction information includes the bearer ID for identifying the PDP context A set up in step 67.

In step 75, the mobile station 10 transmits information indicating that the handover from the EPC 100 to the 3G network 200 is completed ("HO Complete," for example), to the RNC 210.

In step 76, the RNC 210 transmits information indicating that the change of the network to which the mobile station 10 connects (specifically, the change from the EPC 100 to the 3G network 200) is completed ("Relocation Complete," for example), to the SGSN 220.

In step 77, the SGSN 200 transmits update request information indicating a request to update the bearer ("Update PDP Context Request," for example), to the PDN-GW 140. Note that, the PDN-GW 140 maps the EPS bearer to the PDP context. Here, it should be noted that the PDN-GW 140 does not particularly have to manage the packet filter if the EPS bearer and the PDP context are in one-to-one relationship.

In step 78, the PDP context A is set up between the mobile station 10 and the PDN-GW 140 via the 3G network 200. Moreover, packets are transmitted and received between the mobile station 10 and the PDN-GW 140 via the PDP context A.

In step 79, the PDN-GW 140 transmits a packet received from the external network 300 to the mobile station 10, and transmits a packet received from the mobile station 10 to the external network 300.

(Effects and Advantages)

In the second embodiment, the MME 120 controls a handover in accordance with the number of EPS bearers already set up with the mobile station 10 and the EPC 100 and the number of PDP contexts to be set up with the mobile station 10 and the 3G network 200. Accordingly, the handover can be appropriately performed under the assumption of diversification of the types of networks to which the mobile station 10 can connect.

Specifically, when the number of EPS bearers is larger than the number of PDP contexts, the MME 120 refers to the bearer priority table and thus determines to disconnect the EPS bearer having a low priority.

Accordingly, even when the number of EPS bearers that can be set up via the EPC 100 is larger than the number of PDP contexts that can be set up via the 3G network 200, the handover can be appropriately performed.

Third Embodiment

Hereinafter, a description will be given of a third embodiment with reference to the drawings. In the description below, differences between the aforementioned second embodiment and the third embodiment will be mainly described.

Specifically, in the aforementioned second embodiment, the mobile station 10 connects to the single external network 300. Moreover, the MME 120 provided to the EPC 100 determines which EPS bearer to disconnect on the basis of the priorities of the EPS bearers.

Meanwhile, in the third embodiment, the mobile station 10 connects to multiple external networks 300. Note that, an EPS bearer is set up for each of the multiple external networks 300. The MME 120 provided to the EPC 100 disconnects part of the EPS bearers set up for the multiple external networks 300.

(Overview of Radio Communication System)

Figure 9:
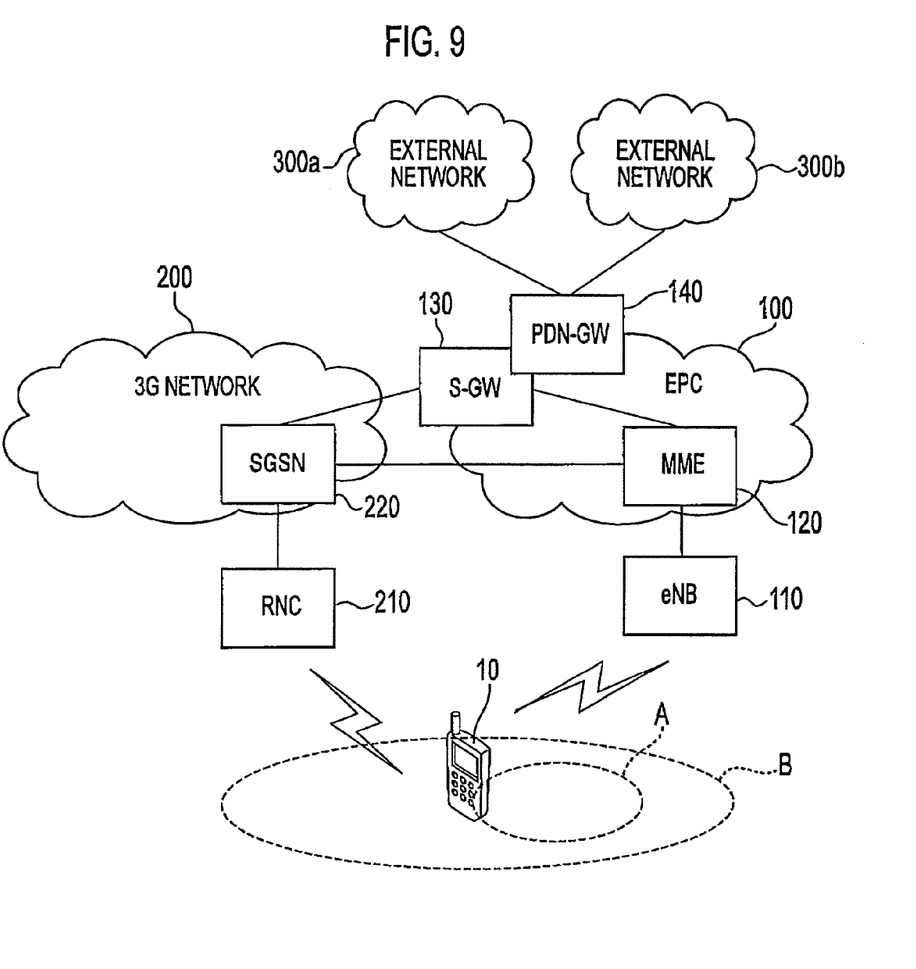
FIG. 9 is a schematic diagram showing a radio communication system according to a third embodiment.

Hereinafter, a description will be given of an overview of a radio communication system according to the third embodiment with reference to the drawings. FIG. 9 is a schematic diagram showing the radio communication system according to the third embodiment. It should be noted that the same reference numerals are given to denote the same constituents as the constituents in FIG. 1 described above.

As shown in FIG. 9, the external networks 300 include an external network 300a and an external network 300b. The PDN-GW 140 is connected to the external network 300a and the external network 300b. It should be noted that the PDN-GW 140 manages the aforementioned packet filter for each of the external networks 300.

The mobile station 10 is configured to be connectable with the multiple external networks 300 via the EPC 100. Specifically, the mobile station 10 connects to the multiple external networks 300 by using EPS bearers set up between the mobile station 10 and the PDN-GW 140 via the EPC 100.

The mobile station 10 is configured to be connectable with the multiple external networks 300 via the 3G network 200. Specifically, the mobile station 10 connects to the multiple external networks 300 by using EPS bearers set up between the mobile station 10 and the PDN-GW 140 via the EPC 100.

Note that, in the third embodiment, a handover from a network capable of setting up a large number of bearers with the mobile station 10 (EPC 100) to a network capable of setting up a small number of bearers with the mobile station 10 (3G network 200) is considered as in the case of the first embodiment.

(Details of MME)

Hereinafter, a description will be given in detail of an MME (Mobility Management Entity) according to the third embodiment.

Figure 10:
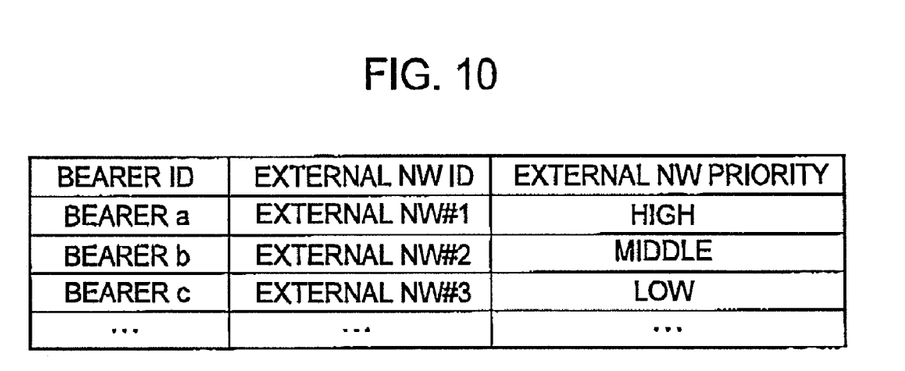
FIG. 10 is a diagram showing an external NW priority table according to the third embodiment.

As shown in FIG. 10, the MME 120 has an external NW priority management table for managing the priorities of the external networks 300 to which the mobile station 10 connects.

Specifically, as shown in FIG. 10, a "bearer ID" column, an "external NW ID" column and an "external NW priority" column are provided in the external NW priority management table. IDs ("bearer a" to "bearer c," for example) for identifying the respective EPS bearers already set up with the mobile station 10 and the EPC 100 are stored in the "bearer ID" column. IDs ("external NW#1" to "external NW#3," for example) for identifying the respective external networks 300 connected via the EPS bearers are stored in the "external network ID" column. Priorities ("high," "medium" and "low," for example) of the respective external networks 300 are stored in the "external NW priority" column.

The MME 120 disconnects part of the EPS bearers already set up with the mobile station 10 and the EPC 100 when the number of EPS bearers already set up with the mobile station 10 and the EPC 100 is larger than the number of PDP contexts to be set up with the mobile station 10 and the 3G network 200. Specifically, the MME 120 disconnects part of the EPS bearers so that the number of EPS bearers can be the same as the number of PDP contexts. In addition, the MME 120 disconnects the EPS bearers in the order from the EPS bearer corresponding to the external network 300 whose external NW priority is low.

(Operation of Radio Communication System)

Figure 11:
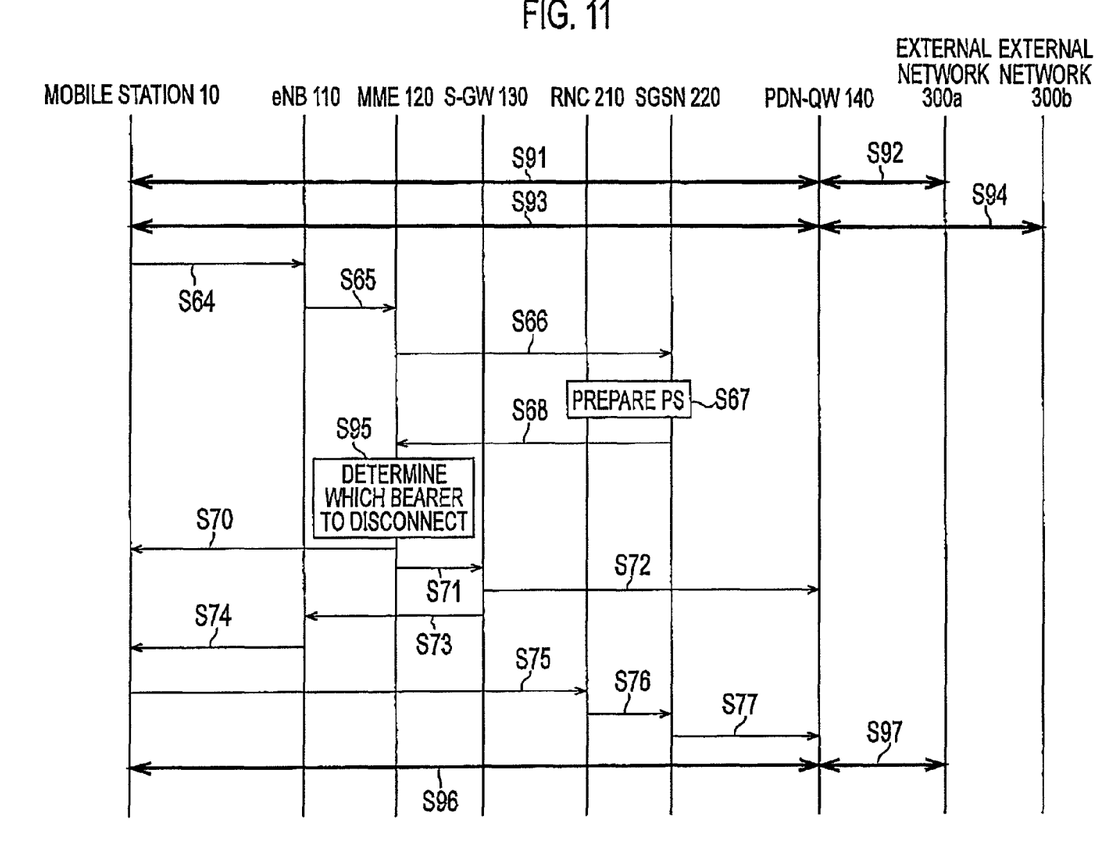
FIG. 11 is a sequence diagram showing an operation of the radio communication system according to the third embodiment.

Hereinafter, a description will be given of an operation of a radio communication system according to the third embodiment with reference to the drawings. FIG. 11 is a sequence diagram showing the operation of the radio communication system according to the third embodiment. It should be noted that the same step numbers are given to denote the same processing operations as those of FIG. 8.

In FIG. 11, a handover from a network capable of setting up a large number of bearers with the mobile station 10 (EPC 100) to a network capable of setting up a small number of bearers with the mobile station 10 (3G network 200) is considered as in the case of the first embodiment. In addition, in FIG. 11, an assumption is made that the mobile station 10 is connected to the external network 300a by the EPS bearer a already set up with the mobile station 10 and the EPC 100. Moreover, an assumption is made that the mobile station 10 is connected to the external network 300b by the EPS bearer b already set up with the mobile station 10 and the EPC 100. Further, an assumption is made that the PDP context A is to be set up between the mobile station 10 and the PDN-GW 140 via the 3G network 200 during the handover process.

As shown in FIG. 11, in step 91, the EPS bearer a is already set up between the mobile station 10 and the PDN-GW 140 via the EPC 100. In addition, packets are transmitted and received between the mobile station 10 and the PDN-GW 140 via the EPS bearer a.

In step 92, the PDN-GW 140 transmits a packet received from the external network 300a to the mobile station 10, and transmits a packet received from the mobile station 10 to the external network 300a.

In step 93, the EPS bearer b is already set up between the mobile station 10 and the PDN-GW 140 via the EPC 100. In addition, packets are transmitted and received between the mobile station 10 and the PDN-GW 140 via the EPS bearer b.

In step 94, the PDN-GW 140 transmits a packet received from the external network 300b to the mobile station 10, and transmits a packet received from the mobile station 10 to the external network 300b.

In step 95, the MME 120 compares the number of EPS bearers already set up with the mobile station 10 and the EPC 100 and the number of PDP contexts set up in step 67. Here, the number of EPS bearers (=2) is larger than the number of PDP contexts (=1).

Accordingly, the MME 120 refers to the aforementioned external NW priority table shown in FIG. 10 and thus determines which EPS bearer to disconnect, the EPS bearer corresponding to one of the external networks 300. The MME 120 determines to disconnect the EPS bearer b corresponding to the external network 300b, for example.

In step 96, the PDP context A is set up between the mobile station 10 and the PDN-GW 140 via the 3G network 200. Moreover, packets are transmitted and received between the mobile station 10 and the PDN-GW 140 via the PDP context A.

In step 97, the PDN-GW 140 transmits a packet received from the external network 300a to the mobile station 10, and transmits a packet received from the mobile station 10 to the external network 300a.

(Effects and Advantages)

In the third embodiment, the MME 120 controls a handover in accordance with the number of EPS bearers already set up with the mobile station 10 and the EPC 100 and the number of PDP contexts to be set up with the mobile station 10 and the 3G network 200. Accordingly, the handover can be appropriately performed under the assumption of diversification of the types of networks to which the mobile station 10 can connect.

Specifically, when the number of EPS bearers is larger than the number of PDP contexts, the MME 120 refers to the external NW priority table and thus determines to disconnect the EPS bearer corresponding to the external network 300 whose external NW priority is low.

Accordingly, even when the number of EPS bearers that can be set up via the EPC 100 is larger than the number of PDP contexts that can be set up via the 3G network 200, the handover can be appropriately performed.

Other Embodiments

Although the present invention has been described through the aforementioned embodiments, any description or drawing constituting a part of this disclosure should not be understood as limiting the present invention. Various alternative embodiments, examples and operational techniques will be apparent from this disclosure to those skilled in the art.

In the aforementioned embodiments, a handover from the next generation radio communication network (EPC 100) to the third generation radio communication network (3G network 200) is exemplified, but the present invention is not limited to this. Specifically, the present invention is applicable to a handover from a network capable of setting up a large number of bearers with the mobile station 10 to a network capable of setting up a small number of bearers with the mobile station 10. The present invention is also applicable to a handover from the next generation radio communication network to WLAN and a handover from the next generation radio communication network to WiMAX, for example.

In another embodiment, the first embodiment and the second embodiment may be combined. Specifically, it is possible to combine the processing to map multiple EPS bearers to a PDP context (hereinafter, referred to as mapping processing) and the processing to disconnect part of the multiple EPS bearers on the basis of the priorities of the EPS bearers (hereinafter, referred to as disconnection processing).

In the aforementioned case, the mapping processing may be performed after the disconnection processing, and also the disconnection processing may be performed after the mapping processing. Since the disconnection processing and the mapping processing are combined, the number of EPS bearers and the number of PDP contexts do not necessarily have to be the same in the disconnection processing.

The method (combining rules) for combining the disconnection processing and the mapping processing may be determined on the mobile station 10 side or the network side. The mobile station 10 may notify the network of the combining rule requested by the mobile station 10 itself during (1) setting up or updating of an RRC connection, (2) network attach processing or (3) bearer activation.

In yet another embodiment, the first embodiment and the third embodiment may be combined. Specifically, it is possible to combine the processing to map multiple EPS bearers to a PDP context (hereinafter, referred to as mapping processing) and the processing to disconnect part of the multiple EPS bearers on the basis of the external NW priorities (hereinafter, referred to as disconnection processing).

In the aforementioned case, the disconnection processing and the mapping processing are combined in accordance with the number of external networks 300, the number of EPS bearers corresponding to each of the external networks 300, the number of PDP contexts, and the like.

The method (combining rules) for combining the disconnection processing and the mapping processing may be determined on the mobile station 10 side or the network side. The mobile station 10 may notify the network of the combining rule requested by the mobile station 10 itself during (1) setting up or updating of an RRC connection, (2) network attach processing or (3) bearer activation.

Although it is not particularly mentioned in the aforementioned embodiments, the EPS bearer priorities and the external NW priorities may be determined on the mobile station 10 side or the network side.

In the aforementioned second and third embodiments, the processing to select an EPS bearer to be disconnected, and the processing to disconnect an EPS bearer are performed by the MME 120, but the present invention is not limited to this case. The processing to select an EPS bearer to be disconnected and the processing to disconnect an EPS bearer may be performed by the mobile station 10 in a case where the number of EPS bearers already set up via the EPC 100 is larger than the number of PDP contexts newly set up via the 3G network 200.

Although it is not particularly mentioned in the aforementioned embodiments, a handover from the EPC 100 to the 3G network 200 may be cancelled in a case where a desired service cannot be maintained by the mapping processing and the disconnection processing. In this case, reselection of a cell included in the eNB 110 or reselection of the eNB 110 may be performed in the next generation radio communication network (EPC 100).

INDUSTRIAL APPLICABILITY

According to the present invention, it is possible to provide a radio communication system and a radio communication method that makes it possible to appropriately perform a handover under the assumption of diversification of the types of networks to which a mobile station can connect.

The invention claimed is:

1. A radio communication system including a first communication network, a second communication network and a mobile station connectable to an external network via any one of the first communication network and the second communication network, the system comprising:

a handover function unit configured to control a handover from the first communication network to the second communication network, wherein the number of first bearers allowed to be set up with the mobile station and the first communication network is larger than the number of second bearers allowed to be set up with the mobile station and the second communication network, the handover function unit controls the handover in accordance with the number of the first bearers already set up with the mobile station and the first communication network and the number of the second bearers to be newly set up with the mobile station and the second communication network, and when a second gateway cannot set up all of the second bearers to correspond to the first bearers already set up, the second gateway updates packet filters set up for the first bearers to map the packet filters into packet filters corresponding to the number of the second bearers.

2. The radio communication system according to claim 1, further comprising:

a gateway device provided between the first communication network and the external network and also between the second communication network and the external network, wherein the handover function unit has a management function to manage a table for associating the first bearers already set up with the mobile station and the first communication network, with the second bearers to be newly set up with the mobile station and the second communication network, and the handover function unit is provided in the gateway device.

3. The radio communication system according to claim 2, wherein the handover function unit has a disconnection function to disconnect at least one of the first bearers already set up with the mobile station and the first communication network in accordance with priorities of the first bearers, when the number of the first bearers already set up with the mobile station and the first communication network is larger than the number of the second bearers to be newly set up with the mobile station and the second communication network.

4. The radio communication system according to claim 1, wherein the handover function unit has a disconnection function to disconnect at least one of the first bearers already set up with the mobile station and the first communication network in accordance with priorities of the first bearers, when the number of the first bearers already set up with the mobile station and the first communication network is larger than the number of the second bearers to be newly set up with the mobile station and the second communication network.

5. The radio communication system according to claim 1, wherein
the external network includes a first external network and a second external network,
the mobile station is connected to the first external network via a first bearer A that is any one of the first bearers already set up with the mobile station and the first communication network, and is connected to the second external network via a first bearer B that is any one of the first bearers already set up with the mobile station and the first communication network, and
the handover function unit has a disconnection function to disconnect any one of the first bearer A and the first bearer B in accordance with priorities of the external networks, when the number of the first bearers already set up with the mobile station and the first communication network is larger than the number of the second bearers to be newly set up with the mobile station and the second communication network.

6. A radio communication method for controlling a handover from a first communication network to a second communication network in a radio communication system including the first communication network, the second communication network and a mobile station connectable to an external network via any one of the first communication network and the second communication network, wherein
the number of first bearers allowed to be set up with the mobile station and the first communication network is larger than the number of second bearers allowed to be set up with the mobile station and the second communication network, and
when a second gateway cannot set up all of the second bearers to correspond to the first bearers already set up, the second gateway updates packet filters set up for the first bearers to map the packet filters into packet filters corresponding to the number of the second bearers,
the method comprising:
controlling the handover in accordance with the number of the first bearers already set up with the mobile station and the first communication network and the number of the second bearers to be newly set up with the mobile station and the second communication network.

* * * * *